United States Patent [19] … [11] Patent Number: 5,083,976
McClure et al. … [45] Date of Patent: Jan. 28, 1992

[54] ADJUSTMENT OF A SHEAR BAR USING AN AIR-BORNE SOUND DETECTOR

[75] Inventors: John R. McClure, New Holland; John G. Berger, Landisville, both of Pa.

[73] Assignee: Ford New Holland, Inc., New Holland, Pa.

[21] Appl. No.: 603,608

[22] Filed: Oct. 26, 1990

[51] Int. Cl.$^5$ .............................................. A01D 75/18
[52] U.S. Cl. ........................................ 460/1; 56/10.2; 56/DIG. 2; 56/DIG. 15
[58] Field of Search ................... 56/10.2, 1, 10.4, 10.8, 56/504, 505, 289, 229, 153, 250, DIG. 1, DIG. 2, DIG. 15, DIG. 16, DIG. 17; 460/1, 2, 3, 105, 149, 150, 119

[56] References Cited

U.S. PATENT DOCUMENTS

| | | | |
|---|---|---|---|
| 4,205,797 | 6/1980 | Bennett, Jr. et al. | 56/10.2 |
| 4,290,255 | 9/1981 | Martenas | 460/2 |
| 4,799,625 | 1/1989 | Weaver et al. | 241/30 |
| 4,843,767 | 7/1989 | Johnson | 51/247 |
| 4,934,612 | 6/1990 | Johnson | 241/37 |

*Primary Examiner*—Terry Lee Melius
*Attorney, Agent, or Firm*—Griffin, Branigan & Butler

[57] ABSTRACT

In a forage harvester, a microphone is used to detect air-borne sounds waves generated by impacts of a rotating cutterhead on a shear bar during adjustment of the shear bar relative to the cutterhead. In response to the detected sound waves, the microphone produces electrical output signals which are applied to a control circuit, the control circuit producing output signals to selectively drive first and second motors to move one end or the other of the shear bar. The microphone may be mounted in positions remote from the shear bar, such as on side sheets defining lateral limits of the crop feed path, or in the interior of a crop feed roll. A vibration absorbing pad is provided between the microphone and its support to isolate the microphone from mechanical vibrations of the support. In one embodiment the microphone serves not only to detect air-borne sound waves generated by impacts of a rotating cutterhead on a shear bar, but also to detect the air-borne sound waves generated by impacts of stones and other hard objects on the crop feed mechanism.

13 Claims, 2 Drawing Sheets

ADJUSTMENT OF A SHEAR BAR USING AN AIR-BORNE SOUND DETECTOR

RELATED APPLICATIONS

This application discloses subject matter which is disclosed and claimed in the following concurrently filed applications: Carl E. Bohman U.S. Ser. No. 07/603,607 entitled Acoustic Detector With Start-Up Control; Carl E. Bohma et.al. U.S. Ser. No. 07/603,606 entitled Method and Apparatus For Hard Object Detection and Carl E. Bohma et.al. U.S. Ser. No. 07/603,609 entitled Metal and Hard Object Detectors With Shared Fixed Support Inside A Feed Roll.

FIELD OF THE INVENTION

The present invention relates to a method for adjusting the position of a shear bar relative to a rotating cutterhead in agricultural harvesting equipment. More particularly, contact between the shear bar and the rotating cutterhead is detected by a detector which detects the air-borne sound waves resulting from such contact, the detector producing output signals to control an automatic shear bar adjusting system, or aid an operator in setting the shear bar.

DESCRIPTION OF PRIOR ART

Johnson U.S. Pat. Nos. 4,934,612 and 4,843,767 disclose a forage harvester having an automatic shear bar adjusting system wherein two knock sensors sense mechanical vibrations induced in a shear bar support as a result of contact between the shear bar and the knives of a rotating cutterhead, the sensors producing output signals to a microprocessor which in turn controls two motors to adjust the position of the shear bar relative to the cutterhead. Each time a "knock sense" routine is called, the outputs of both knock sensors are tested and it is assumed that a knock has occurred if the output of either knock sensor exceeds a threshold level for at least some minimum percentage of the time interval during which the sensor outputs are tested.

Weaver et.al. U.S. Pat. No. 4,799,625 discloses a shear bar adjusting system similar to that of the Johnson patent, but having only one knock sensor. Weaver et.al. employs a "get noise" routine which is called each time a shear bar adjust routine is executed. The get noise routine is employed to obtain an indication of noise vibrations induced in the sensor by normal harvester operation, this indication being used in the shear bar adjust routine to set the sensitivity of the control system to the output of the knock sensor. The get noise routine includes a "test generator" subroutine which actuates a knocker and samples the output of the knock sensor, thus testing the operability of the knock sensor.

From the Johnson and Weaver et.al. patents it is obvious that shear bar adjusting systems employing mechanical vibration sensors must employ special apparatus or procedures to compensate for the unreliability of such sensors and their sensitivity to vibrations induced in the shear bar by normal harvester operation.

Other methods have been employed to sense contact between a cutterhead and a shear bar, including the use of magnetic sensors, electrical circuits detecting contact between the cutterhead and shear bar, and optical sensors.

Regardless of the type of sensor used, all prior methods have required that the sensor be located on, or in close proximity to, the shear bar where dust conditions and vibrations of the shear bar induced by normal machine operation affect the sensor.

SUMMARY OF THE INVENTION

An object of the present invention is to provide a method and apparatus for detecting contact between a shear bar and the knives of a rotating cutterhead by sensing air-borne sound waves produced by such contact.

An object of the present invention is to provide a sensor for sensing air-borne sound waves produced by contact of a shear bar with the knives of a rotating cutterhead, the sensor preferably being mounted inside a feed roll which feeds material toward the cutterhead.

An object of the present invention is to provide a sensor for sensing air-borne sound waves produced when the knives of a rotating cutterhead contact a shear bar, the sensor being mounted on a vibration absorber so as to isolate it from mechanical vibrations occurring in the support for the vibration absorber.

A further object of the invention is to provide a circuit for controlling the adjustment of a shear bar relative to a rotating cutterhead by detecting air-borne sound waves produced by impacts of the cutterhead on the shear bar, the circuit also controlling a material feed mechanism to stop the feed mechanism upon detection of air-borne sound waves produced by impacts of hard materials on the feed mechanism, the circuit performing both functions in response to output signals produced by a single sensor.

In accordance with the principles of the present invention, a forage harvester of conventional design, and including a shear bar, a rotatable cutterhead and a system for adjusting the position of the shear bar relative to the cutterhead by sensing contact between the two as the shear bar is moved, is provided with a microphone for sensing air-borne sounds produced when the rotating cutterhead contacts the shear bar. The microphone is preferably mounted inside a hollow feed roll which feeds crop material to the cutterhead. The microphone is mounted on a vibration absorber which is in turn supported inside the feed roll, the vibration absorber serving to isolate the microphone from any vibrations which may occur in the support. The microphone produces output signals which are applied to a filter, the output of the filter being digitized and applied to a microprocessor which controls two motors for moving the ends of the shear bar relative to the cutterhead. In one embodiment the microprocessor is also programmed to control stopping of the feed mechanism when the microphone detects the impact of a hard object on the feed mechanism and in this embodiment the filter is a programmable band-pass filter controlled by the microprocessor to pass signals having frequencies characteristic of shear bar/cutterhead impacts or, alternatively, to pass signals having frequencies characteristic of the impact of hard objects on the feed mechanism.

Other objects of the invention and its mode of operation will become apparent upon consideration of the following description and the accompanying drawing.

DETAILED DESCRIPTION OF THE INVENTION

Figure 1:
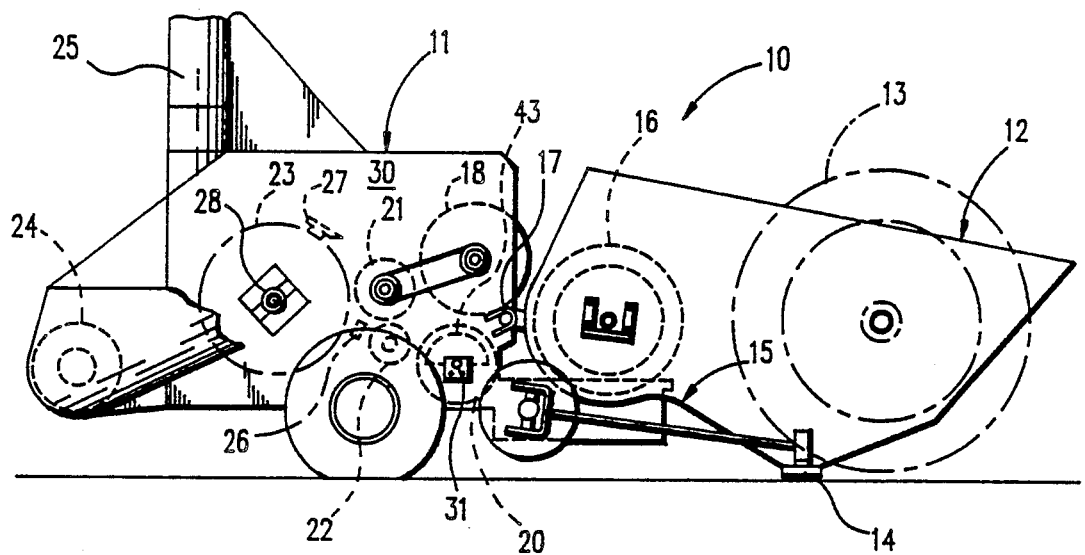
FIG. 1 is a schematic side view of a forage harvester in which the invention may be used.

FIG. 1 illustrates a forage harvesting machine of the type in which the present invention may be employed. It is apparent that the invention may also be employed with benefit for adjustment of a shear bar relative to a rotating cutterhead in other types of farm equipment and other machinery. The representative farm machine illustrated in FIG. 1 may be similar to the forage harvester in U.S. Pat. Nos. 3,523,411 to Waldrop et.al. and 3,959,953 to Garrott.

The forage harvester, generally designated by reference numeral 10, comprises a base unit 11 and an attachment 12 for gathering crop material and feeding it to the base unit for processing. Attachment 12 directly cuts crop material in the field and feeds it to base unit 11 where it is chopped and eventually conveyed to a trailing forage wagon (not shown). A direct cut attachment is shown for exemplary purposes but in actual practice any type of attachment, e.g., a row crop unit or a windrow pickup, could be used with a base unit of the type shown insofar as the present invention is concerned.

More particularly, the attachment shown includes a reel 13, depicted in phantom, which operates in a conventional manner to guide material over a cutter bar 14 and up an inclined floor 15 to a consolidating auger 16, also depicted in phantom outline. Attachment 12 is pivotally mounted to base unit 11 at 17 and is adapted to feed crop material to the space between upper and lower front feed rolls 18, 20 and then on to upper and lower rear feed rolls 21, 22 which in turn feed material to a cutterhead 23 (shown in phantom) which chops the crop material and guides it rearwardly to conveyor means 24 in a well known manner. The conveyor 24 commonly comprises an auger mounted transversely for feeding the chopped crop material to a blower unit which conveys it upwardly via a vertical spout 25 (partially shown) and then rearwardly to a trailing forage wagon.

The front and rear pairs of upper and lower feed rolls compress into a mat-like configuration the crop material which has been gathered by the attachment and consolidated by auger 16. The mat of material is fed rearwardly across the top surface of a shearbar 26 which is operatively associated with a series of cutting elements or knives 27 (one of which is shown in phantom) on rotating cutterhead 23. The cutterhead is journaled for rotation by mounting assembly 28 in a sidewall 30 of base unit 11. There are two sidewalls 30, one at each side of the crop feed path for defining the lateral extent of the feed path, and cutterhead 23 is journaled for rotation by a mounting assembly 28 in each sidewall.

Figure 2:
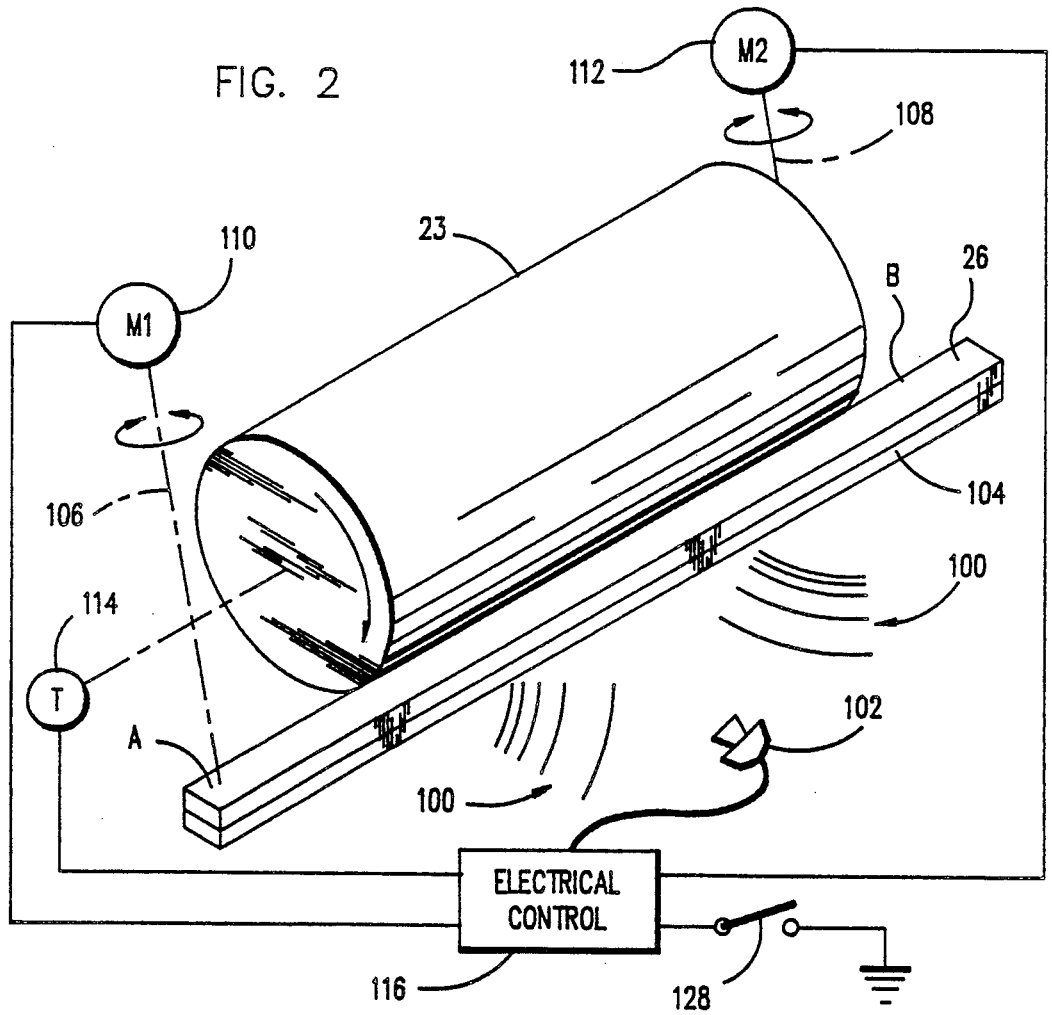
FIG. 2 schematically illustrates a system for automatically adjusting a shear bar relative to the knives of a rotating cutterhead.

As disclosed in Weaver et.al. U.S. Pat. No. 4,799,625, and as schematically illustrated in FIG. 2, two bidirectional motors 110 and 112 are provided for adjusting the position of shear bar 26 relative to the cutterhead 23. The shear bar is movably mounted on a fixed shear bar support 104 in a manner well known in the art. Motor 110 drives a lead screw 106 which is linked to one end (A) of shear bar 23 to move end A of the shear bar relative to the support 104 and the cutterhead 23. In like manner, motor 112 drives a lead screw 108 which is linked to end B of the shear bar to move end B relative to support 104 and the cutterhead 23. U.S. Pat. Nos. 4,678,130 and 4,436,248 show suitable linkages driven by lead screws for moving the ends of a shear bar.

When an operator manually actuates a switch 128, a microprocessor-based electrical control circuit 116 senses the output of a tachometer 114. The tachometer produces an output signal proportional to the rate of rotation of cutterhead 23. If the cutterhead is rotating at more than a predetermined minimum speed, the output signal from the tachometer enables control circuit 116 to execute a sequence of steps during which it selectively energizes motors 110 and 112 to adjust the position of the shear bar 26 relative to the rotating cutterhead 23.

The shear bar adjustment procedure is fully described in the aforementioned patent to Weaver et al. The procedure comprises a sequence of steps which may briefly be summarized as follows.

Step 1 Energize motor 110 to move end A of the shear bar away from the cutterhead.

Step 2 Energize motor 112 to move end B of the shear bar away from the rotating cutterhead.

Step 3 Energize motor 110 to move end A of the shear bar toward the rotating cutterhead until contact is made between the shear bar and the knives of the cutterhead or until a fixed interval of time has elapsed, whichever occurs first.

Step 4 If step 3 is terminated because of contact, energize motor 110 for a short fixed interval to move end A of the shear bar away from the cutterhead a short distance. motor 112 to move end B of the shear bar toward the rotating cutterhead until contact is made between the shear bar and the knives of the cutterhead or until a fixed interval of time has elapsed, whichever occurs first.

Step 6 If step 5 is terminated because of contact, energize motor 112 for a short fixed interval to move end B of the shear bar away from the cutterhead a short distance.

Step 7 Repeat steps 3-6 until ends A and B of the shear bar contact the knives of the cutterhead on each of two separate energizations of the respective motors which move the ends.

In the Weaver et.al. patent, contact between the shear bar and the knives of the rotating cutterhead is sensed by a piezo-electric knock sensor which is mounted on the shear bar support 104 and senses vibrations induced in the support when a cutterhead knife contacts the shear bar 26. During the adjust procedure the control circuit 116 repeatedly senses the output signal from the knock sensor to determine when contact has been made between a cutterhead knife and the shear bar.

Figure 3:
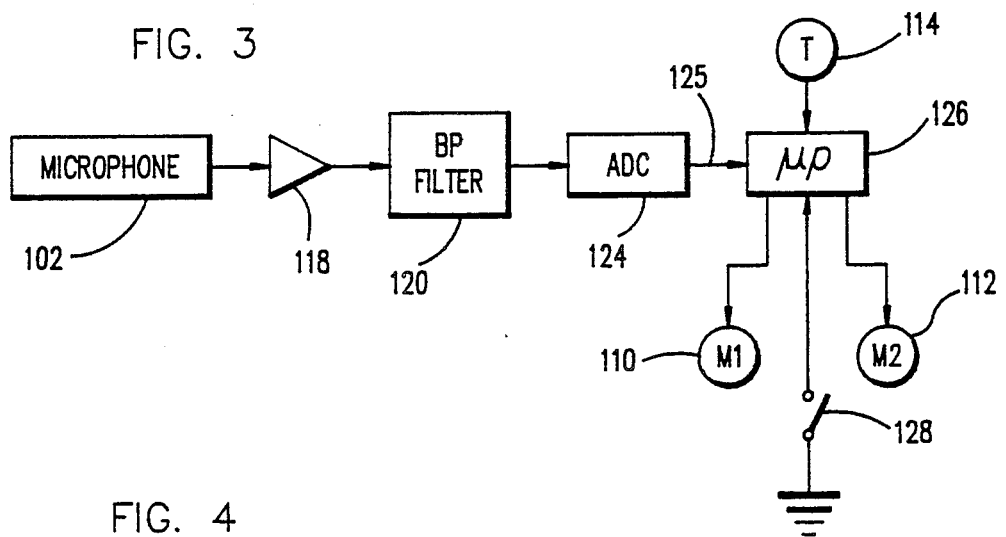
FIG. 3 is a schematic block diagram of a circuit for producing signals for adjusting a shear bar.

In accordance with the principles of the present invention, a microphone 102 is used to sense the air-borne sound waves produced when the knives of the rotating cutterhead impact the shear bar 26. As shown in FIG. 3, the microphone is connected through an amplifier 118 to a band pass filter 120 which is designed to pass only signals in the frequency range characteristic of sound waves produced when the rotating cutterhead knives contact the shear bar. 1 During a shear bar adjusting procedure, initiated by closure of manually actuated switch 128, the microphone senses all air-borne sound waves 100 impinging on it and produces an analog electrical output signal containing frequencies characteristic of the sound waves. The analog signal is amplified by amplifier 118 and applied to filter 120. The filter passes on to its output 122 only those frequencies characteristic of the air-borne sound waves resulting from impacts of the cutterhead knives on the shear bar.

The output of filter 120 may be connected to an analog-to-digital converter 124 which is in turn connected to a microprocessor 126. The microprocessor 126 samples the output of the converter 124 to determine when knife-shear bar contact occurs, and in response thereto issues signals to control motors 110 and 112 to accomplish the shear bar adjustment as described in the Weaver et.al. patent.

The use of a microphone to sense air-borne sound waves rather than mechanical vibrations induced in the shear bar 26 or its support 104 permits the positioning of the microphone at locations remote from the shear bar. The microphone 102 therefore need not be subjected to the mechanical stresses and dirty environmental conditions that occur when a sensor is mounted on the shear bar or its support. The microphone 102 may be mounted in any convenient location, such as on a side wall 30 or even on shear bar support 104 so long as it can sense the air-borne sounds produced by contact between the cutterhead knives and the shear bar and is isolated from vibrations which may occur in the mounting means. It is particularly advantageous to position the microphone within one of the feed rolls 18, 20, 21, 22 so as to protect it from moisture, dirt, and accumulations of crop material.

Figure 4:
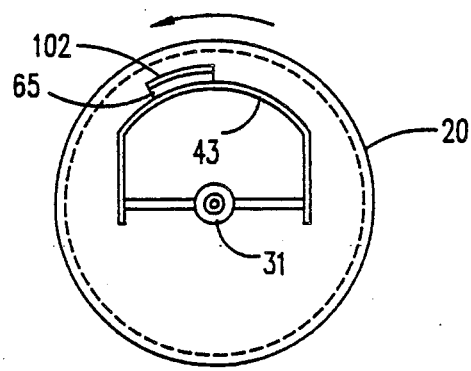
FIG. 4 is a diagrammatic illustration of a microphone mounted within a rotatable feed roll; and, FIG. 5 is a schematic block diagram of a circuit having a single microphone for detecting either impacts of a rotating cutterhead on a shear bar or impacts of hard objects on a feed mechanism.

As shown in U.S. Pat. No. 4,433,528 to Bohman, and in the related applications referenced above, the lower front feed roll comprises a hollow cylinder having two end caps. One end cap is affixed to one end of the cylinder and driven by a splined drive shaft. The other end cap is affixed to the cylinder and is journaled for free rotation about a fixed stub shaft. This stub shaft corresponds to the shaft 31 shown in FIG. 1. As explained in the related applications, a housing 43 may be mounted on shaft 31 inside the feed roll 20 to support the sensors and associated circuits comprising a magnetic metal detector and a hard object detector for detecting metal and hard objects in the crop material being fed through the forage harvester. In accordance with the present invention, the microphone 102 may be mounted on the housing 43 as illustrated in FIG. 4. Alternatively, the microphone may be mounted on a bracket attached to housing 43 as illustrated in the aforementioned copending applications.

The microphone 102 may be of any type capable of sensing air-borne sound waves. A thin film microphone of polyvinylidene fluoride, available under the trade name KYNAR from the Pennwalt Company, is preferred. The microphone is mounted on a vibration absorbing pad 65 to insulate the microphone from mechanical vibrations. The related applications referenced above show a microphone of this type mounted on housing 43 for the purpose of sensing stones and other hard objects in crop material being fed through the forage harvester, the output of the sensor being applied to a circuit which controls the stopping of the feed mechanism.

Figure 5:
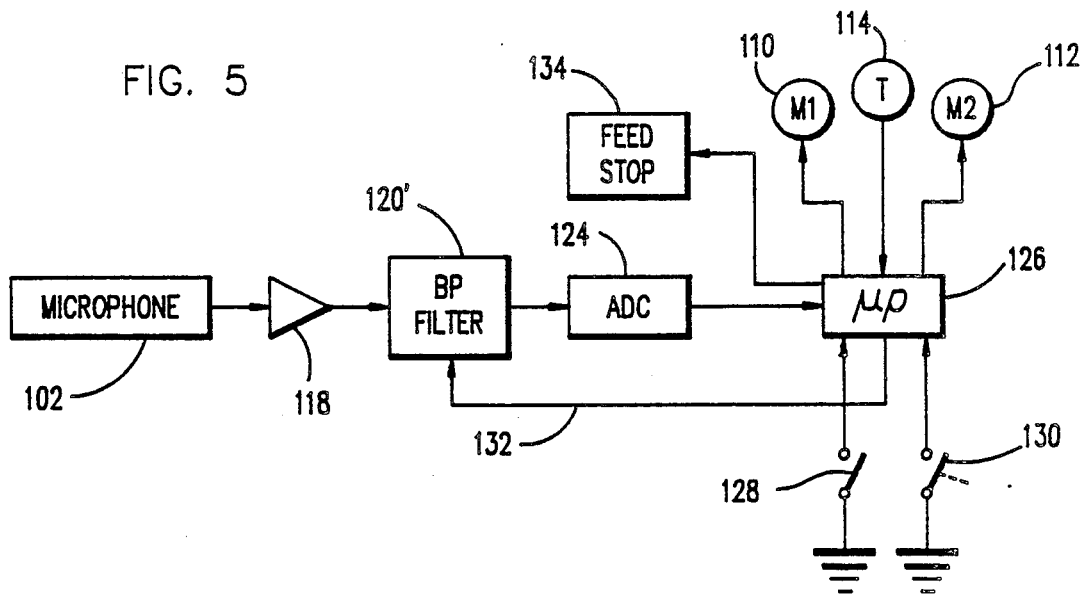

Since the feeding of crop material through the forage harvester does not take place during intervals when the shear bar is being adjusted relative to the cutterhead, it is possible to use the same microphone for both purposes if the directional sensitivity of the microphone used is such that it can detect air-borne sound waves emanating from knife-shear bar contacts as well as those resulting from impacts of hard objects on the feed roll 20. FIG. 5 shows a suitable circuit arrangement for this purpose.

The circuit of FIG. 5 includes a microphone 102 for sensing air-borne sound waves, an amplifier 118, a programmable band pass filter 120', an analog-to-digital converter 124, a microprocessor 126, a shear bar adjust switch 128 and a clutch switch 130. The clutch switch 130 is closed when a clutch is engaged to drive the crop feed mechanism of the harvester. When switch 130 is actuated it causes microprocessor 126 to output a signal over lead 132 to program the filter 120' so that the filter passes only those frequencies in the range of frequencies produced when a stone or other hard object impacts a feed roll. The sound waves produced by the impacts are sensed by microphone 102, amplified by amplifier 118 and applied to the filter. The frequencies characteristic of the impact of a hard object on a feed roll are passed through the filter, digitized by A/D converter 124, and applied to the microprocessor 126. The microprocessor responds to detection of a hard object by producing an output signal to a feed stop circuit 134 stop the crop feed mechanism as fully explained in the copending applications referenced above.

The clutch switch 130 also causes microprocessor 126 to ignore actuation of switch 128 or, if a shearbar adjustment is in progress, to terminate the adjustment procedure. This insures that shearbar adjustment cannot be initiated or carried out while crop material is being fed through the harvester. If clutch switch 130 is not actuated, momentary actuation of switch 128 causes the microprocessor to execute the adjustment routine for adjusting the shear bar relative to the cutterhead if the tachometer 114 produces a signal indicating that the cutterhead is rotating faster than a predetermined rate. During execution of the routine, the microprocessor controls filter 120' via lead 132 so that the filter will pass only frequencies characteristic of contacts between the shear bar and cutterhead, and the circuit functions in the same manner as the circuit of FIG. 3.

Figure 3A:
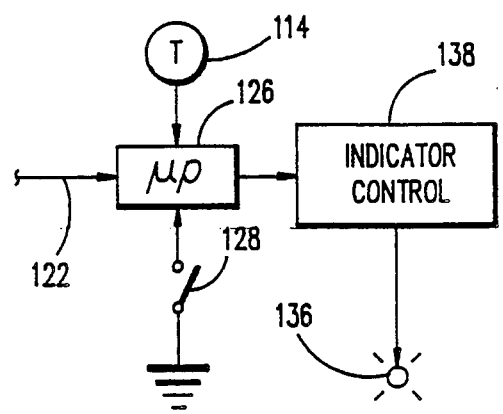
FIG. 3A illustrates a modification of the circuit of FIG. 3 suitable for use in a system wherein an operator manually adjusts a shear bar relative to a cutterhead.

From the foregoing description it is seen that the present invention is admirably suited for use in automatic shear bar adjusting systems wherein the ends of the shear bar are driven by electric motors. However, it also finds use in shear bar adjusting systems such as those disclosed in U.S. Pat. Nos. 4,436,248 and 4,678,130 wherein the lead screws 106 and 108 are manually turned to adjust the shear bar. In this case the microprocessor 126 is programmed to energize an indicator means such as a visual indicator means 136 (FIG. 3A) to signal an operator when the cutterhead is impacting the shear bar. The visual indicator may be energized by a control circuit 138 in response to output signals from microprocessor 126. The visual indicator means 136 should be positioned on the harvester so as to be visible to the operator as he is adjusting the shear bar.

While a preferred embodiment of the invention has been described in specific detail for purposes of illustration, it will be understood that various modifications and substitutions may be made in the described embodiment without departing from the spirit and scope of the invention as defined by the appended claims. For example, in the embodiment illustrated in FIG. 3A it is not necessary to employ a microprocessor. Discrete circuits may be employed as shown in the related applications referenced above. In the embodiment illustrated in FIG. 5, the programmable band pass filter 120' may be replaced by two filters with appropriate switching or gating means. In any of the illustrated embodiments, two or more microphones mounted in different locations and connected in parallel may be used to provide better detection of the impacts of the knives on the shear bar.

The invention in which an exclusive property or privilege is claimed is defined as follows:

1. In a cutting mechanism having a shear bar and a rotting cutterhead carrying knives which cooperate with the shear bar to cut material fed between the shear bar and the knives, a method of adjusting said shear bar relative to said cutterhead by sensing impacts of the knives on the shear bar and selectively moving said shear bar in accordance with the sensing of impacts, said method being characterized in that the sensing of said impacts comprises sensing sound waves propagating through the air and resulting from said impacts and said shear bar is moved in accordance with said sensed sound waves.

2. In a cutting mechanism having a shear bar and a rotating cutterhead carrying knives which cooperate with the shear bar to cut material fed between the shear bar and the knives, said cutting mechanism having an adjusting means for selectively moving said shear bar in accordance with sensed impacts of said knives on said shear bar, the improvement comprising a sensor for sensing sound waves propagating through the air and resulting from said impacts, said sensor being connected to said adjusting means and responsive to said sound waves for applying signals to said adjusting means in accordance with the sensed sound waves.

3. The improvement as claimed in claim 2 wherein said sensor is a microphone.

4. The improvement as claimed in claim 3 wherein said adjusting means comprises means for automatically moving said shear bar relative to said knives in response to impacts sensed by said microphone.

5. The improvement as claimed in claim 3 wherein said adjusting means comprises means for manually moving said shear bar relative to said knives and visual indicator means responsive to impacts sensed by said microphone for indicating to an operator when said knives impact said shear bar as the operator adjusts the means for manually moving the shear bar.

6. The improvement as claimed in claim 3 and further comprising a support for supporting said microphone and vibration absorbing means, said vibration absorbing means being located between said support and said microphone to insulate said microphone from vibrations in said support.

7. The improvement as claimed in claim 3 wherein said cutting mechanism includes feed rolls for feeding said material to said cutterhead, at least one of said feed rolls being hollow, and mounting means for mounting said microphone inside said hollow feed roll.

8. The improvement as claimed in claim 7 and further comprising vibration absorbing means positioned between said microphone and said mounting means.

9. In a forage harvester having a shear bar and a rotating cutterhead carrying knives which cooperate with the shear bar to cut crop material fed between the shear bar and the knives by a crop feed mechanism, said forage harvester having adjusting means for adjusting said shear bar relative to said knives and stop means for stopping said crop feed mechanism, the improvement comprising:

a single microphone for sensing air-borne sound waves generated by impacts of said knives on said shear bar and/or impacts of hard objects in said crop material on said crop feed mechanism, and circuit means responsive to said sensed air-borne sound waves of said microphone for controlling said adjusting means and said stop means.

10. The improvement as claimed in claim 9 wherein said circuit means includes filter means responsive to said microphone for passing signals having frequencies characteristic of impacts of hard objects on said crop feed mechanism when said crop feed mechanism is in motion and passing signals having frequencies characteristic of impacts of the knives on said shear bar when said crop feed mechanism is not in motion.

11. The improvement as claimed in claim 10 wherein said circuit means comprises:

a programmable band pass filter connected to said microphone;

a microprocessor means for applying signals to said band pass filter, said adjusting means and said stop means; and, analog-to-digital converter means connected between said band pass filter and said microprocessor means.

12. The improvement as claimed in claim 11 and further comprising:

a manually actuated switch; and, switch means for producing a signal when said crop feed mechanism is in motion, said microprocessor being responsive to manual actuation of said switch for controlling said band pass filter to pass signals having frequencies characteristic of impacts of said knives on said shear bar and responsive to a signal produced by said switch means for controlling said band pass filter to pass signals having a frequencies characteristic of impacts of hard objects on said crop feed mechanism.

13. The improvement as claimed in claim 7 and further comprising stop means responsive to said microphone for stopping said feed rolls when said microphone senses the impact of a hard object on one of said feed rolls.

* * * * *